US006434493B1

United States Patent
Olson

(12) United States Patent
(10) Patent No.: US 6,434,493 B1
(45) Date of Patent: Aug. 13, 2002

(54) METHOD AND CIRCUIT FOR SUMMING UTILITY METERING SIGNALS

(75) Inventor: John A. Olson, Brookfield, WI (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 09/314,558

(22) Filed: May 19, 1999

(51) Int. Cl.[7] .............................. G01F 1/00; G01F 7/00
(52) U.S. Cl. ........................ 702/45; 702/100; 73/861
(58) Field of Search .............................. 702/33, 45–55, 702/85, 86, 100, 113, 114, 182, 183, 189; 137/487.5; 73/861, 861.01–861.03

(56) References Cited

U.S. PATENT DOCUMENTS

| | | | | |
|---|---|---|---|---|
| 3,823,310 A | * | 7/1974 | Kalotay et al. ................ 702/99 |
| 4,100,799 A | | 7/1978 | Bradham, III et al. ......... 73/197 |
| 4,217,929 A | | 8/1980 | Pelt .......................... 137/527.8 |
| 4,429,571 A | | 2/1984 | Kullmann et al. ............. 73/197 |
| 4,487,333 A | * | 12/1984 | Pounder et al. ................ 222/54 |
| 4,885,943 A | * | 12/1989 | Tootell et al. ............ 73/861.77 |
| 5,111,683 A | * | 5/1992 | Fond ........................... 73/1.27 |
| 5,181,241 A | * | 1/1993 | Strobel et al. ......... 379/106.03 |
| 5,190,075 A | * | 3/1993 | Tentler et al. ............... 137/501 |
| 5,497,664 A | * | 3/1996 | Jorritsma ...................... 73/861 |
| 5,576,486 A | * | 11/1996 | Paz .............................. 73/197 |

* cited by examiner

Primary Examiner—Marc S. Hoff
Assistant Examiner—Manuel L. Barbee
(74) Attorney, Agent, or Firm—Quarles & Brady LLP

(57) ABSTRACT

A summing module (10) and method for interfacing a compound meter with two metering signals to a plurality of different output devices for displaying or retransmitting meter data includes an enclosure (20), a summing circuit (32), networks (41) for setting a ratio between the two metering signals before they are summed, and a ratio between one of the input signals and an output signal, and output subcircuits (60, 65) for providing signals compatible with at least two meter data output devices. The module (10) also provides for testing of the inputs for short circuits and open circuits and passing the result on to the output.

23 Claims, 3 Drawing Sheets

METHOD AND CIRCUIT FOR SUMMING UTILITY METERING SIGNALS

TECHNICAL FIELD

The invention relates to utility meters, and more particularly to summing circuits used in such equipment to process metering signals.

DESCRIPTION OF THE BACKGROUND ART

Examples of prior compound flow meters are seen in Bradham III, et al., U.S. Pat. No. 4,100,799; Pelt, U.S. Pat. No. 4,217,929 and Kuhlmann et al., U.S. Pat. No. 4,429,571.

A compound flow meter incorporates a low volume flow meter and a high volume flow meter. The low volume flow meter is mechanically or magnetically coupled to a meter register to provide a readout of a volumetric consumption quantity. A high volume flow meter, often a turbine meter, is also coupled to a meter register, and may be coupled to the same meter register as the low volume flow meter. To determine total flow, the flows of the high volume flow meter and the low volume flow meter must be added together.

In the above-mentioned mechanical types of compound meters, as disclosed in Bradham III, et al., U.S. Pat. No. 4,100,799, a single register was mechanically coupled to both flow meters.

In Paz, U.S. Pat. No. 5,576,486, a compound flow meter is provided with an electronic module that performs the summation and outputs a result to a visual display. The electronic module is situated in a housing which is attached to the meter housing. In Paz, frequency signal inputs from the high volume flow and low volume flow are multiplied by respective multipliers K1 and K2, and the high volume flow signal is then multiplied by a ratio of K2/K1 to account for the difference in the two signals. The signals are then summed, multiplied by another multiplier K3, and then integrated to produce a volumetric consumption quantity which is output to a visual display.

A general object of the present invention is the retrofitting and interfacing of different types of existing meter registers to different types of meter data output devices. Thus, different input ratios may be present between signals from the high volume flow meter and the low volume flow meter. Different output ratios may be needed to operate different types of meter data output devices.

In addition, the summator unit must be small in size, low in cost, extremely versatile and suitable for harsh environments, such as subsurface pits for metering equipment. It must be easily connected to existing metering equipment.

SUMMARY OF THE INVENTION

The invention is practiced in a modular unit, which can be connected to various types of registers on compound meters, and which can be connected to various types of meter output devices and displays. The device is connected via convenient snap together connectors of the type disclosed in Karsten et al., U.S. Pat. No. 6,162, 082, issued Dec. 19, 2000.

Inside the device, the steps of receiving and ratioing input data, summing the input data and ratioing the output signals are all performed. In addition, the circuitry provides for signal conversion for operation with a plurality of different meter registers and a plurality of different meter data output devices. Still further, the circuitry in the device provides for lead line (open circuit and short circuit) monitoring of a plurality of inputs, and logical summing of these results for passing through to the meter data output devices. Such a versatile interfacing device has heretofore been unknown in the industry.

The invention provides a method and apparatus in which the ratioing step can be easily switched between a ratio of 1:10 and 1:100 from the first input signal to the second input signal and from a ratio of 1:1 to 1:100 between the first input signal and the output signal.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE PREFERRED EMBODIMENTS

Figure 1:
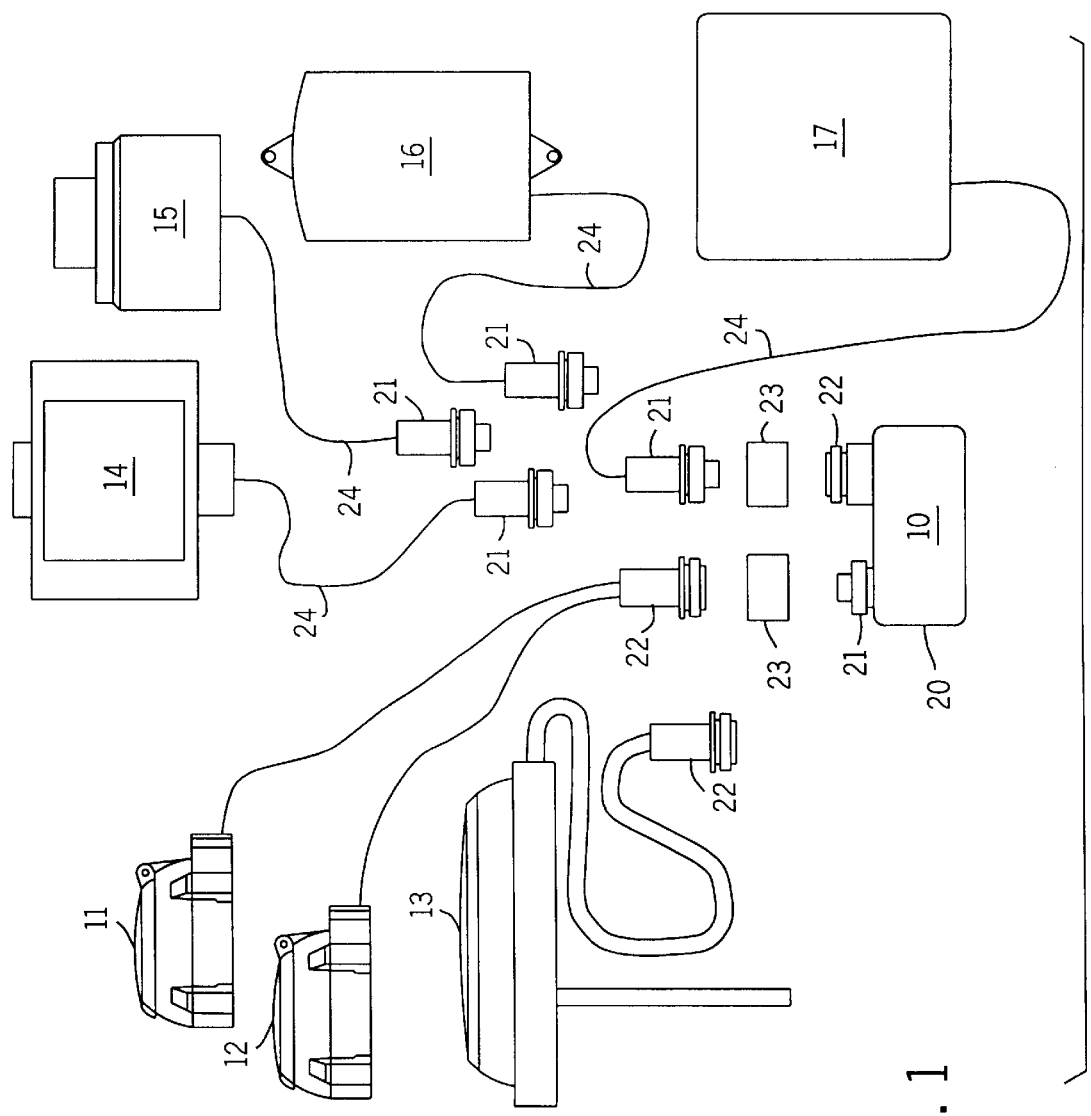
FIG. 1 is a first diagram of the apparatus of the present invention along with associated equipment for practicing the method of the present invention.
Figure 2:
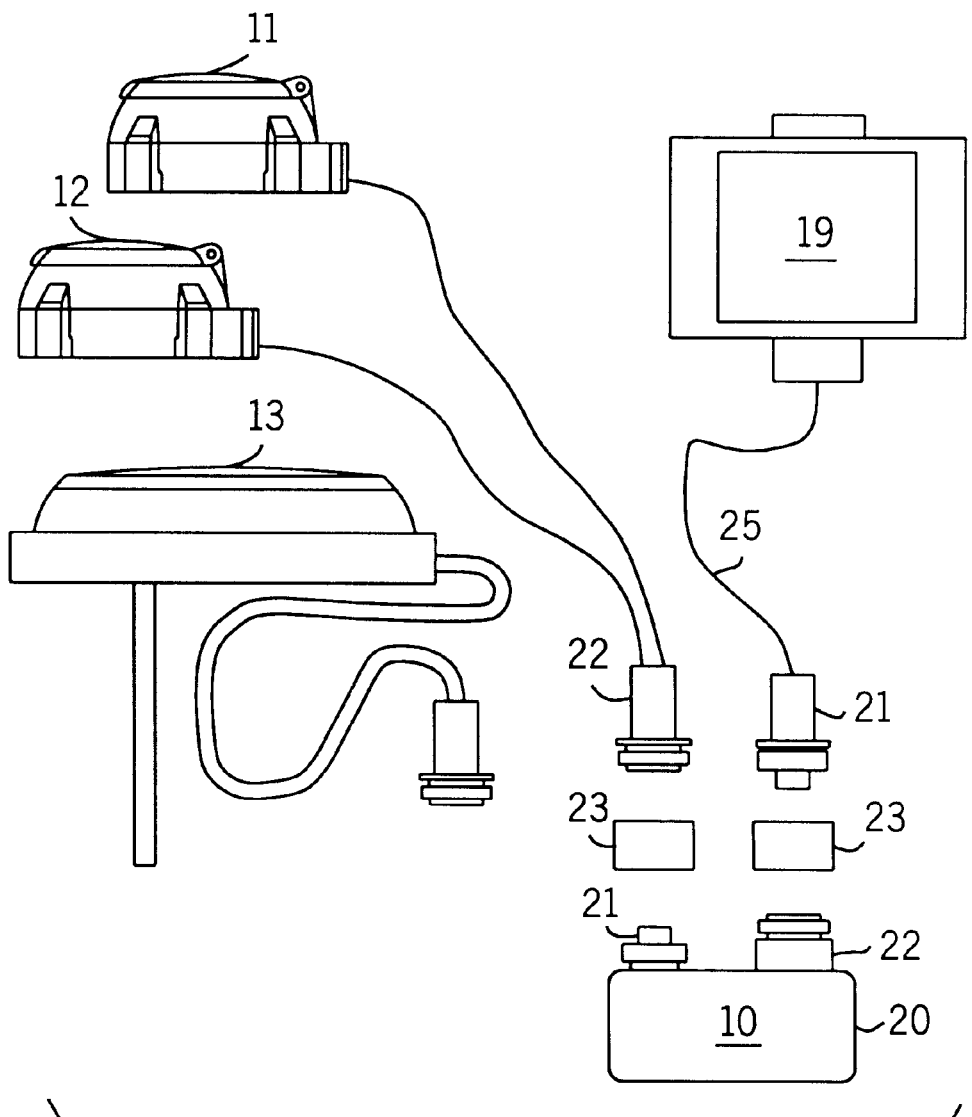
FIG. 2 is a second diagram of the apparatus of the present invention along with associated equipment.

FIGS. 1–2 illustrates a summator 10 of the present invention, which receives signals from a pair of individual registers 11, 12 on a compound meter (not shown) or from a single compound meter register 13 providing signals for both the high volume flow meter and low volume flow meter of a compound meter (not shown). The registers 11, 12 and 13 accumulate units of volumetric consumption and generate a signal pulse representing a predetermined number of units of volumetric consumption.

In FIG. 1, the summator 10 operates in a summing mode to combine signals from individual meter registers 11, 12 or from a compound meter register 13, which represent flow volume through the high volume flow meter and low volume flow meter of a compound meter, respectively. The summator 10 provides a single output signal to one of four types of meter data output devices 14, 15, 16 or 17. The first output device 14 is read with a close proximity reading instrument of a type known in the art. The second and fourth devices 15 and 17 are devices for RF transmission of meter data to handheld, mobile and fixed receiver units. The third output device 16 is a transmitter device for a network using telephone lines for communication.

In FIG. 1, the summator 10 operates with any device that can receive an open-collector output of fixed pulse width, of the type produced by a piezo electric element as disclosed in Strobel et al., U.S. Pat. No. 4,868,566, issued Sep. 19, 1989. This signal is active in a logic low state. The summator 10 performs a plurality of functions including: 1) signal conversion between inputs and outputs, 2) lead line supervision of inputs, 3) ratioing of inputs, 4) selection of the outputs and ratioing of the output to the inputs, 5) summing the results for two flow meters, including the results from testing for lead line open circuit or short circuit, and 6) limiting the output to a predetermined frequency which might otherwise be exceeded by the dual inputs.

The summator 10 has an enclosure 20 for use in subsurface pits or enclosures that are subjected to environmental conditions such as extreme moisture or submersion in water or other fluids. Two three-part, sealed connectors 21–23 on the enclosure 20 are more fully described in Karsten et al., U.S. Pat. No. 6,162,082, issued Dec. 19, 2000, and such disclosure is hereby incorporated by reference.

Each connector has a female part 21, a male part 22 and a locking nut 23. The enclosure 20 contains one male connector part 21 and one female connector part 22.

The summator 10 includes electronic circuitry for accepting the signals from the two registers 11, 12 or for accepting two signals from the compound register 13, and producing a single totalized output signal. The summator 10 will produce an output signal that represents the sum of the consumption of the turbine (high flow or main flow) element and disk metering (low flow or auxiliary flow) element of a compound meter (not shown). The output will be either 1) an open collector FET (field effect transistor) output of specified pulse width, which is produced by a piezo electric element as disclosed in Strobel et al., U.S. Pat. No. 4,868,566, issued Sep. 19, 1989, and which is accepted as a compatible input signal by devices 14, 15, 16 and 17 or 2) an output signal compatible with a remote readout register 19. For definitional purposes, the device 19 is considered a meter data output device.

The system in FIG. 2 includes the two registers 11, 12 or the compound register 13 with two signal outputs, and the output device is the device 19.

The output resolution of the summator 10 is identical to the resolution of the meter register for a main or high volume flow meter having an FET output. The output compatible with the remote meter register 19 has a resolution $\frac{1}{100}^{th}$ of the meter register for the main or high volume flow meter having the FET output. This provides a total of four possible configurations for output signals to account for the two possible ratios of resolution, 1:10 and 1:100, between the main and auxiliary flow registers 11, 12 and the output devices 14, 15, 16 and 17 and possible conversion of the signal from a main flow meter register 11 to a remote readout register 19. These four possible configurations include:

1. An FET output signal representing combined main and auxiliary flows, which is compatible with devices 14, 15, 16 and 17 and has a 1:10 ratio between the input for the main flow meter and the input for the auxiliary flow meter in a compound meter. The output has a 1:1 ratio with the input for the main flow meter. (A system for operating in this mode is shown in FIG. 1)

2. An FET output signal representing combined main and auxiliary flows, which is compatible with devices 14, 15, 16 and 17 and has a 1:100 ratio between the input for the main flow meter and the input for the auxiliary flow meter in a compound meter. The output has a 1:1 ratio with the input for the main flow meter. (A system for operating in this mode is shown in FIG. 1)

3. An output signal representing combined main and auxiliary flows, which is compatible with the remote readout register 19 and has a 1:10 ratio between the input for the main flow meter and the input for the auxiliary flow meter in a compound meter. The output has a 1:100 ratio with the input for the main flow meter. (A system for operating in this mode is shown in FIG. 2)

4. An output signal representing combined main and auxiliary flows, which is compatible with the remote readout register 19 and has a 1:100 ratio between the input for the main flow meter and the input for the auxiliary flow meter in a compound meter. The output has a 1:100 ratio with the input for the main flow meter. (A system for operating in this mode is shown in FIG. 2)

In addition to these four basic configurations, an additional output can be provided for transmitting a parallel output signal to a billing computer, for example, in parallel to the output to a meter data output device.

The summator circuit 20 will monitor for short circuit and open circuit line conditions between itself and the two meter registers 11, 12 or between itself and the compound register 13. This is referred to as lead line supervision and is provided to the automatic meter reading system by diode effect of the output FET in registers 11, 12 or 13. The method for performing this function using a prior known circuit was described in Strobel et al., U.S. Pat. No. 5,181,241. In the circuit of the present invention a short or open circuit connection of the input registers 11, 12 is logically summed and is then passed to the output devices 14, 15, 16 or 17 by creating a short circuit condition on the output FET (T2) (FIG. 3) of the summator circuit 20.

The FET output connects through a standard instrumentation wire 24 (FIG. 1) where the length is determined by the requirements of the specific automatic meter reading device. The output compatible with remote readout register 19 connects through an instrumentation wire 25 up to a maximum length of 500 feet (FIG. 2).

The electronic circuitry is supported in a circuit board, which is mounted in a plastic enclosure and encapsulated by potting material, so that it is capable of submersion in pit environments. The summator 10 uses two separate connectors 21–23, one for the input (two input signals) and one for the output signal.

Figure 3:
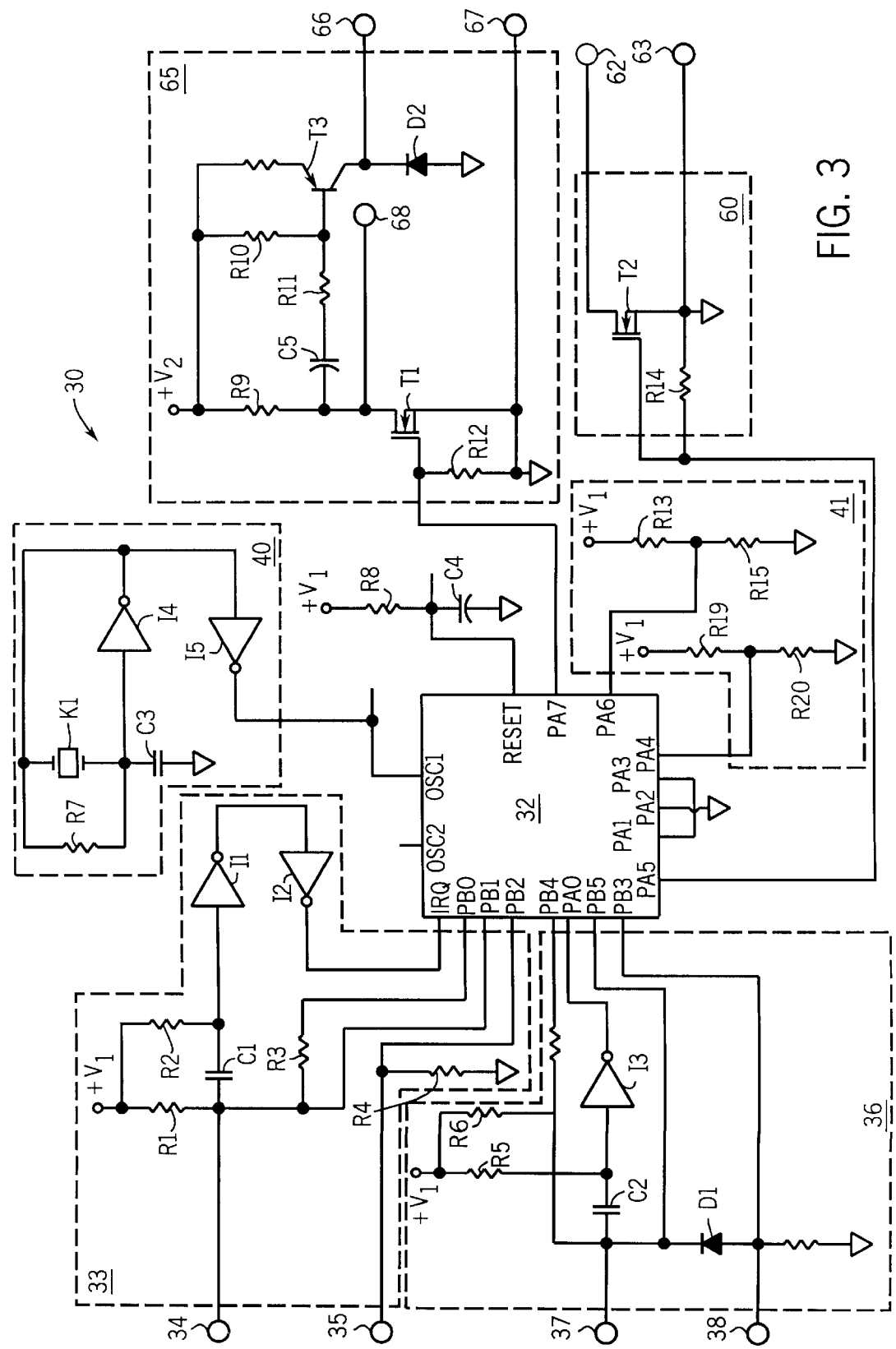
FIG. 3 is a detailed electrical schematic of the circuit of the present invention.

As shown in FIG. 3, the summing circuit 30 is formed on a circuit board and is powered by a lithium battery (not shown). The circuit 30 is constructed around an MC68HC705J1ACDW CPU 32 available from Motorola, Inc.

Input subcircuit 33 receives signals from the main flow or high flow meter register through inputs 34 and 35. Input 34 is connected through input subcircuit 33 to input/output terminals PB0, PB1 and IRQ, while input 35 is connected through a pull-down resistor R4 to input PB2. Power is provided from a power supply input (+V1) connected through two pull-up resistors R1 and R2. A capacitor C1 is provided to condition the input signal. Two inverters I1 and I2 in series with capacitor C1 provide logic and impedance matching to the IRQ input on the CPU 32. Input subcircuit 33 provides the proper interface for lead line supervision across a diode (not shown) which is provided, in effect, by the meter register circuit.

Input subcircuit 36 receives signals from the auxiliary or low flow meter through inputs 37 and 38. Input 37 is connected through subcircuit 36 to the PB4, PA0, PB5 and PB3 inputs and outputs on the CPU 32. Input 38 is connected to CPU I/O pin PB3. This is the enable line for performing the lead line open circuit test. The PB4 output is connected through a resistor to summator input 37. Every five minutes the logic states at I/O pins PB3 and PB4 are reversed to reverse polarity across the summator circuit pair of inputs 37 and 38 and in absence of an open circuit this provides a valid input signal at input PB5. This same type of test is performed for input circuit 33 at two and one-half minutes before and after the test for input circuit 36. Short circuit conditions are monitored constantly in both circuits 33, 36 by sensing if an active low signal stays low for an unusually long period. Only one inverter I3 is required for logic and impedance matching to the PA0 input, which is an interrupt input. The subcircuit 36 includes a diode D1 connected across input/output terminals PB5 and PB3, in the event that a device is not connected to the inputs 37, 38.

Subcircuit 40 is a crystal oscillator circuit for supplying clock signals to drive the CPU 32. This circuit includes crystal K1, and also includes inverters I4 and I5 for logic and impedance matching.

Subcircuit 41 provides divider circuits with resistors R13, R15, R19 and R20 setting the output ratio and the input ratio, respectively. These divider circuits are connected to the PA4 and PA6 inputs on the CPU 32. Values for resistors R13 and R15 have a 1:100 ratio and these determine the ratio of 1:10 or 1:100 ratio between input signals for the main flow and auxiliary flow, respectively. One of the resistors R13, R15 is removed to select a respective one of the two possible ratios between the input signals. Values for resistors R19 and R20 (also a 1:100 ratio) are selected to determine the ratio and type of output, either piezo FET type (1:1 input to output ratio) or the type for the remote readout register 19 (100:1 input to output ratio). One of the resistors R19, R20 is removed to select a respective one of the two possible input to output ratios.

The CPU 32 provides the proper output for count totalization and lead line supervision to the output device through output circuits 60 and 65. Output circuit 60 provides a signal similar to a piezo electric output signal from outputs 62 (signal) and 63 (GND). A second output signal is provided from terminal 68 for a billing computer, for example. Field effect transistor T2 is switched on from output PA5 to provide a short circuit in the event there is a short circuit or open circuit indication on either pair of inputs 34, 35 or 37, 38 from registers 11, 12 or register 13.

Open circuits and short circuits are monitored on both pairs of summator inputs 34, 35, 37 and 38 and the results are passed to the output. The summator circuit 30 is effective to logically combine the results of the lead line testing of the inputs 34, 35, 37 and 38.

Output circuit 65 provides a signal of a type received by the remote readout register 19 from outputs 66, 67 in response to a signal from the PA7 output in the CPU 32. A supply voltage (+V2), at a higher level than the first supply voltage (+V1), is provided through a network of resistors, R9, R10, R11 and a capacitor C5 and transistor T3. A diode D2 is connected to the collector of transistor T3 to protect FET T3 from reverse bias voltage.

Thus, from the above description, it can be seen that signals received at the inputs 34, 35 and 37, 38, respectively, are converted to signals at the outputs 62, 63 and 66, 67, of a type recognized by various types of meter data output devices. The ratio of inputs is selected to be 1:10 or 1:100. The ratio of inputs to outputs is selected to be 1:1 or 100:1. The lead line supervision (for short circuits and open circuits) is performed on both inputs. The result of testing the inputs is fed through to the outputs 62, 63.

In addition, the CPU monitors the frequency of the inputs, which due to a limitation in prior known output devices is limited to about 3 Hz or less. Input signals at each input are limited to 1 Hz. However, in a summing mode a signal may be received at the high volume input at about the same time as the significant signal (the 10th signal or the 100th signal) is received at the low volume input. Without further limitations, this would result in two output pulses. The CPU 62 operates a 400-millisecond timer and will delay a second output signal for 400 milliseconds to limit the output signal to slightly less than 3 Hz. Thus, the frequency limit on the inputs is effectively passed through to the outputs.

This has been a description of the preferred embodiments of the method and apparatus of the present invention. Those of ordinary skill in this art will recognize that modifications might be made while still coming within the spirit and scope of the invention and, therefore, to define the embodiments of the invention, the following claims are made.

I claim:

1. A method of interfacing a first flow signal and a second flow signal received from at least one flow meter register to provide a summed output signal representing a volumetric consumption quantity, the method comprising:

inputting to an interfacing device enclosure a first input signal representing a first volume of flow and a second input signal representing a second volume of flow;

within said interfacing device enclosure, summing the signal representing the first volume of flow through the first flow meter with the signal representing the second volume of flow;

selecting a first ratio from at least two ratios between the first input signal and the second input signal, wherein said first ratio is utilized in summing the first input signal and the second input signal;

outputting an output signal from the interfacing device which has been converted from the first input signal and the second input signal to a signal compatible with a meter data output device.

2. The method of claim 1, wherein the inputting, summing and controlling steps are performed in an individual interfacing device enclosure which is connectable to a plurality of different meter registers and to a plurality of different meter data output devices for retransmission or display of the meter data.

3. The method of claim 2, wherein the first ratio between the first input signal and the second input signal is 1:10.

4. The method of claim 2, wherein the first ratio between the first input signal and the second input signal is 1:100.

5. The method of claim 2, further comprising controlling a ratio between the first input signal and a first output signal; and wherein the ratio between the first input signal and the output signal is 100:1.

6. The method of claim 1, 2, 3, 4 or 5, wherein while inputting the first input signal and the second input signal, a further step comprising testing for at least one of: an open circuit condition and a short circuit condition occurring for at least one of the first input and the second input.

7. The method of claim 6, wherein a result for the testing step is signaled in the output signal to the meter data output device.

8. The method of claim 7, wherein the result that is signaled to the meter data output device signals at least one of: a short circuit condition and an open circuit condition.

9. Summing circuitry operably connected to at least one consumption quantity accumulating device to provide signals representing a sum of a first volume of flow and a second volume of flow, said summing circuitry comprising:

a summing circuit having a first input for receiving a first input signal representing the first volume of flow and a second input for receiving a second input signal representing the second volume of flow;

ratioing subcircuitry operably connected to said summing circuit for selecting a first ratio from at least two ratios between the first input signal and the second input signal, wherein said first ratio is used by summing circuit for calculating a sum of first input signals and the second input signals and generating an output signal representative of total volumetric consumption; and an output subcircuit for receiving said signal representing total volumetric consumption and providing a signal compatible with a meter data output device.

10. The circuitry of claim 9, wherein the summing circuit, the ratioing subcircuitry operably connected to said summing circuit and the output subcircuit are assembled in a single interface device enclosure which is connectable to a plurality of different metering input devices and to a plurality of different meter data output devices for retransmission or display of the meter data.

11. The circuit of claim 10, wherein the ratioing subcircuitry provides a ratio of 1:10 from the first input signal to the second input signal.

12. The circuit of claim 10, wherein the ratioing subcircuitry provides a ratio of 1:100 from the first input signal to the second input signal.

13. The circuit of claim 10, wherein the ratioing subcircuitry provides a ratio between the first input signal and a first output signal; and wherein the ratio between the first input signal and the output signal is 100:1.

14. The circuit of claim 9, 10, 11, 12 or 13, wherein said summing circuit tests for at least one of: an open circuit condition and a short circuit condition occurring for at least of the first input and the second input.

15. The circuit of claim 14, wherein the output subcircuit receives a signal from the summing circuit transmits an output signal to the meter output device to signal at least one of: a short circuit condition and an open circuit condition.

16. A method of interfacing a first flow signal and a second flow signal received from at least one flow meter register to provide a summed output signal representing a volumetric consumption quantity, the method comprising:

inputting to an interfacing device a first input signal representing a first volume of flow and a second input signal representing a second volume of flow, wherein said first input signal and said second input signal have a predetermined duration and an upper frequency limit;

within said interfacing device, summing the signal representing the first volume of flow through the first flow meter with the signal representing the second volume of flow; and outputting an output signal from the interfacing device which represents a sum of the first input signal and the second input signal, said output signal having a predetermined duration and an upper frequency limit such that the interface device is transparent to the meter data output device in relation to a device generating either one of the first flow signal and the second flow signal.

17. The method of claim 16, wherein the inputting, summing and controlling steps are performed in an individual interfacing device enclosure which is connectable to a plurality of different meter registers and to a plurality of different meter data output devices for retransmission or display of the meter data.

18. The method of claim 17, wherein the first ratio between the first input signal and the second input signal is 1:10.

19. The method of claim 17, wherein the first ratio between the first input signal and the second input signal is 1:100.

20. The method of claim 17, further comprising controlling a ratio between the first input signal and a first output signal; and wherein the ratio between the first input signal and the output signal is 100:.

21. The method of claim 16, 17, 18, 19, or 20, wherein while inputting the first input signal and the second input signal a further step comprising testing for at least one of: an open circuit condition and a short circuit condition occurring for at least one of the first input and the second input.

22. The method of claim 21, wherein a result for the testing step is signaled in the output signal to the meter data output device.

23. The method of claim 22, wherein the result that is signaled to the meter data output device signals at least one of: a short circuit condition and an open circuit condition.

* * * * *

UNITED STATES PATENT AND TRADEMARK OFFICE
CERTIFICATE OF CORRECTION

PATENT NO.     : 6,434,493 B1
DATED          : August 13, 2002
INVENTOR(S)    : John A. Olson It is certified that error appears in the above-identified patent and that said Letters Patent is hereby corrected as shown below:

Column 4,
Line 42, "terminals PBO" should be -- terminals PB0 --;
Line 47, "inverters I1 and 12" should be -- inverters I1 and I2 --;
Line 54, "PB4, PAO," should be -- PB4, PA0 --;
Line 62, "input PBS." should be -- input PB5. --;

Column 5,
Line 1, "the PAO input," should be -- the PA0 input, --;

Column 8,
Line 24, "is 100:." should be -- is 100:1. --;
Line 29, "signal a" should be -- signal, a -- (insert a comma).

Signed and Sealed this

Twenty-second Day of April, 2003

JAMES E. ROGAN
*Director of the United States Patent and Trademark Office*